W. SYKES.
CONTROL SYSTEM.
APPLICATION FILED JULY 11, 1914. RENEWED FEB. 15, 1919.
1,367,106.
Patented Feb. 1, 1921.
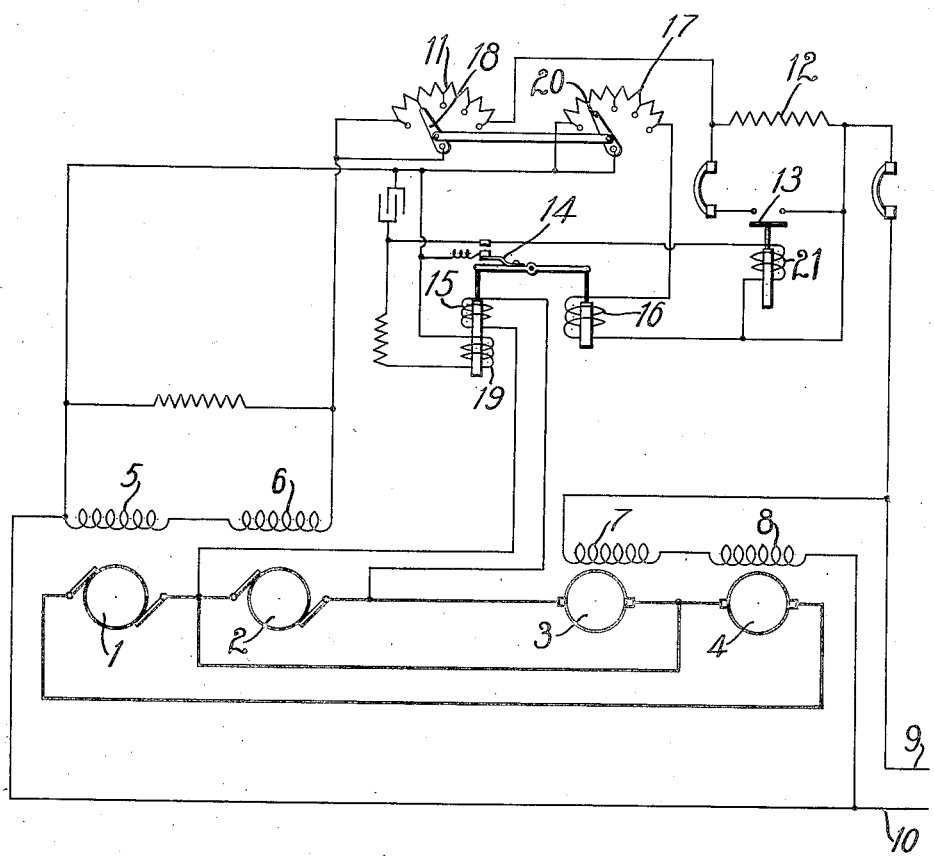

UNITED STATES PATENT OFFICE.

WILFRED SYKES, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,367,106.     Specification of Letters Patent.     Patented Feb. 1, 1921.

Application filed July 11, 1914, Serial No. 850,296. Renewed February 15, 1919. Serial No. 277,280.

*To all whom it may concern:*

Be it known that I, WILFRED SYKES, a subject of the King of Great Britain, and a resident of Pittsburgh, in the county of Allegheny and State of Pennsylvania, have invented a new and useful Improvement in Control Systems, of which the following is a specification.

My invention relates to control systems and particularly to such systems as are employed to control the voltage of electric generators.

My invention has for its object to provide a simple and efficient means for impressing a relatively high voltage upon the field magnet windings of an electric generator in order to cause the voltage of the generator to quickly reach a value corresponding to the adjustment of the lever of the controlling rheostat.

In the operation of reversing rolling mills and similar machines where frequent stops and reversals are necessary, it is desirable that the voltage of the generators which supply energy to the motors shall be quickly responsive to the adjustments of the controlling lever. It is well known that, if only the normal exciter voltage be applied to the field magnet winding, an appreciable amount of time must elapse before the generator voltage reaches a value corresponding to the throw of the controlling lever.

I provide an arrangement by means of which a relatively high voltage is applied to the field magnet windings when the generator voltage is below that for which the lever is set. The voltage of the exciter circuit is automatically reduced to a normal value when the generator voltage reaches the desired value. A differential relay switch operates, when the generator voltage is below the desired value, to short circuit a resistor that is normally in series with the field magnet winding and thereby cause a relatively heavy current to traverse the field magnet windings, the generator voltage being thus quickly brought to the desired value. When the generator voltage reaches the value corresponding to the adjustment of the lever, the relay operates automatically to remove the short circuit for the resistor, the exciter voltage being again reduced to the normal value and the voltage of the generator remaining substantially constant.

In the accompanying drawing, the single figure is a diagrammatic view of circuits and apparatus embodying my invention.

Two electric generators 1 and 2 supply energy to motors 3 and 4 which are connected in a closed circuit therewith. The generators 1 and 2 are respectively provided with separately excited field magnet windings 5 and 6 which are arranged in series, and the motors 3 and 4 are provided with field magnet windings 7 and 8, respectively, which are also connected in series. The generator field-magnet windings and the motor field-magnet windings are respectively connected in parallel relation to conductors 9 and 10 which may be connected to any suitable source of energy having a constant voltage. A controller 11, which is here diagrammatically shown as a variable resistor, operates to control the resistance of the circuit of the generator field magnet windings. A second resistor 12, which is normally in circuit with the field magnet windings 5 and 6, is controlled by an electromagnetic switch 13 which short circuits the resistor under predetermined conditions.

The electromagnetic switch 13 is controlled by a differentially wound relay switch 14 having coils 15 and 16 that are wound to oppose each other. The coil 15 is connected across the terminals of the generator 2 and is therefore responsive to the generator voltage. The coil 16 is connected across the line of the exciter circuit and its excitation is controlled by a variable resistor 17. The resistors 11 and 17 are mechanically connected in order that an adjustment of the resistor 11 will cause a corresponding adjustment of the resistor 17, and the resistance of the two circuits will accordingly be varied at the same rate. The resistor 17 is so arranged that the ampere turns of the coil 16 will always be the same as those of the coil 15 when the generator voltage reaches a value corresponding to the position of the lever 18 of the resistor 11. The switch 14 is provided, also, with an auxiliary coil 19 that is in circuit with it. The function of the coil 19, which exerts a comparatively small pull, is to insure that, as soon as the switch 14 opens, its contact members will be positively separated. This action prevents the continual sparking at the contact members of the relay switch, which occurs when the coils 15 and 16 are energized to a substantially equal degree.

It may be assumed that the controller lever 18 has been thrown to the right in order to increase the voltage of the generators to the full value. The lever 20 of the resistor 17 will be actuated to assume a corresponding position relatively to the resistor 17. The resistance of the circuit of the coil 16 is accordingly reduced and the ampere-turns of the coil 16 are greater than those of the coil 15 because the generator voltage has not yet reached the value corresponding to the position of the lever 18. The switch 14 will therefore be closed to complete the circuit of the coil 21 of the switch 13 and thus short-circuit the resistor 12. The short-circuiting of the resistor 12, which causes, for example, a drop in potential of 150 volts, causes a correspondingly increased voltage to be impressed upon the field magnet windings 5 and 6. The result is to cause the generator voltage to build up much more rapidly than would be the case if only the normal voltage were applied to the windings.

When the generator voltage reaches a value corresponding to the position of the controlling lever 18, the ampere-turns of the coil 15 are equal to those of the coil 16, and the switch 14 will accordingly open, the coil 19 operating to positively separate the contact members. The coil 21 of the switch 13 is thereby deënergized, and the short circuit of the resistor 12 is broken to insert the latter in circuit with the field magnet windings. The generator voltage will not be further increased, since the current traversing the field magnet windings has reached a normal value.

If the control lever 18 be quickly thrown to any intermediate position, the action is the same, the switch 14 opening as soon as the generator voltage corresponds to the position of the lever. If the control lever is actuated so slowly that the generator voltage can increase at the same rate as the excitation of the field windings, the switch 14 will not operate because the ampere-turns of the coils 15 and 16 will remain equal.

It will be noted that I provide a system by means of which the voltage of the generator may be increased much more rapidly than results when only the normal voltage is applied to its field magnet windings. By means of this arrangement, the loss of much valuable time in the operation of rolling mills and similar machines may be avoided.

While I have shown and described a system comprising two generators and two motors, which represents an actual installation, it will be understood that this system is illustrative only and that my invention may be applied equally as well to a system embodying a single generator which is connected to a similar intermittent load.

I claim as my invention:

1. In a control system, the combination with an electric generator having a field-magnet winding and a controller in circuit with said winding, of automatic means for controlling the excitation of said winding in accordance with the value of the voltage of said generator relatively to that corresponding to the adjustment of the controller, said means comprising a resistor and a relay for governing the operation of the resistor.

2. In a control system, the combination with a generator having a field-magnet winding, a controller in circuit therewith, and a resistor normally in circuit with said winding, of a relay switch for closing a shunt circuit for said resistor when the generator voltage is below that corresponding to the adjustment of the controller.

3. In a control system, the combination with a generator having a separately excited field-magnet winding and a variable resistor in circuit therewith, of means comprising a second resistor inserted in circuit with the field magnet winding for automatically causing an increased excitation of said winding when said variable resistor is adjusted to raise the generator voltage and for automatically causing a normal excitation of said winding when the generator voltage reaches a value corresponding to the adjustment of said resistor.

4. In a control system, the combination with a generator having a field-magnet winding and a controlling resistor in circuit therewith, of means comprising a second resistor inserted in circuit with the field-magnet winding for temporarily increasing the excitation of said winding when the controlling resistor is adjusted to increase the generator voltage and for decreasing the excitation of said winding when the generator voltage has reached a value corresponding to the adjustment of the resistor.

5. In a control system, the combination with a generator having a field-magnet winding and a controlling resistor in circuit therewith, of a second resistor normally in circuit with said winding, means for automatically shunting said second resistor when the controlling resistor is adjusted to increase the generator voltage and for automatically removing the shunt circuit for said resistor when the generator voltage reaches a value corresponding to the adjustment of the controlling resistor.

6. In a control system, the combination with a generator having a field-magnet winding, and means for controlling the excitation of said winding, of a resistor normally in circuit with said winding, a differential relay switch for controlling a shunt circuit for said resistor, said switch being provided with coils that are respectively energized in accordance with the generator voltage, and in accordance with the adjustment of the controlling means.

7. In a control system, the combination with a generator having a field-magnet winding, a controller in circuit therewith, and a resistor normally in circuit with said winding, of means for closing a shunt circuit for said resistor when the generator voltage is below that corresponding to the adjustment of the controller.

8. In a control system, the combination with a generator having a separately excited field-magnet winding and a variable resistor in circuit therewith, of means comprising a relay responsive to the voltage of said generator for automatically causing an increased excitation of said winding when said resistor is adjusted to raise the generator voltage and for automatically causing a normal excitation of said winding when the generator voltage reaches a value corresponding to the adjustment of said resistor.

9. In a control system, the combination with a generator having a field-magnet winding and a resistor in circuit with said winding, of means for adjusting the voltage of said generator and means for controlling a shunt circuit for said resistor in accordance with the value of the voltage of said generator relatively to that corresponding to the setting of said adjusting means.

10. In a control system, the combination with a generator having a field-magnet winding, and a resistor in circuit with said winding, of means for controlling said resistor comprising a switch and electromagnetic means for controlling said switch in accordance with the relation between the normal and the actual voltage values of said generator.

11. In a control system, the combination with a generator having a field-magnet winding, a source of current and a resistor in circuit with said winding and said source, of means for adjusting the excitation of said winding, and means for maintaining a shunt circuit for said resistor while the actual voltage of said generator is below that for which the adjusting means is arranged.

12. In a control system, the combination with a generator having a field-magnet winding, a source of current and a resistor in circuit with said winding and said source, of means for adjusting the excitation of said winding, and means for maintaining a shunt circuit for said resistor while the actual voltage of said generator is below that for which the adjusting means is arranged, said last named means comprising a relay having a coil energized in accordance with the position of the adjusting means and a second and opposing coil energized in accordance with the actual voltage of said generator.

13. In a control system, the combination with a generator having a field-magnet winding and adjustable means for controlling the excitation of said winding, of means comprising a resistor and a differential relay associated therewith for automatically reducing the time required to increase the excitation of said winding by reason of its reactive effects, said means being operable only while the voltage of said generator is below a normal value.

14. In a control system, the combination with a generator having a field-magnet winding and adjustable means for controlling the excitation of said winding, of means comprising a resistor and a relay associated therewith for automatically reducing the time required to increase the excitation of said winding by reason of its reactive effects, said means being operable only while the voltage of said generator is below a normal value to apply an abnormally high voltage to said winding.

15. An electrical system comprising a generator, resistance in the field-magnet circuit thereof, means for pre-selecting an effective value of the resistance which corresponds to a desired generator voltage, and means for automatically accelerating the attainment of the desired generator voltage by temporarily causing a greater change in the effective value of the resistance than that selected.

16. An electrical system comprising a generator, resistance in the field-magnet circuit thereof, means for pre-selecting an effective value of the resistance which corresponds to a desired generator voltage, and other means for automatically causing a greater change in the effective value of the resistance than that selected during the time that the generator voltage differs substantially from that desired.

17. An electrical system comprising a generator, resistance in the field-magnet circuit thereof, means for pre-selecting an effective value of the resistance which corresponds to a desired generator voltage, and means for automatically accelerating the attainment of the desired generator voltage by temporarily causing a greater change in the effective value of the resistance than that selected when such pre-selection is made.

18. An electrical system comprising a generator, resistance in the field-magnet circuit thereof, means for selectively rendering a portion of the resistance ineffective so as to produce a desired generator voltage, and automatic means for temporarily rendering more than the selected portion of the resistance ineffective so as to accelerate the attainment of the desired generator voltage.

19. An electrical system comprising a dynamo-electric machine, resistance in one of the circuits thereof, means for pre-selecting an effective value of the resistance which corresponds to a desired condition of the dynamo-electric machine, and means for automatically accelerating the attainment of the said desired condition by temporarily causing a greater change in the effective value of the resistance than that selected.

20. An electrical system comprising a generator, resistance in the field-magnet circuit thereof, means for selectively changing the effective value of the resistance to produce a predetermined generator voltage, and means dependent upon the voltage of the generator and the selected value of the resistance for accelerating the attainment of the predetermined generator voltage by temporarily causing a greater change in the effective value of the resistance than that selected.

21. An electrical system comprising a generator, resistance in the field-magnet circuit thereof, means for selectively changing the effective value of the resistance to produce a predetermined generator voltage, a differential relay for temporarily causing a greater change in the effective value of the resistance than that selected, the said relay having a winding the excitation of which is dependent upon the generator voltage and another winding the excitation of which is dependent upon the selected value of the resistance.

22. An electrical system comprising a dynamo-electric machine, resistance in one of the circuits thereof, switching means for selectively changing the resistance, and other switching means for automatically effecting greater changes in the resistance when the selected changes are made.

In testimony whereof, I have hereunto subscribed my name this 30th day of June, 1914.

WILFRED SYKES.

Witnesses:
GRAHAM BRIGHT,
B. B. HINES.